(12) United States Patent
Mahn (10) Patent No.: US 7,158,808 B2
(45) Date of Patent: Jan. 2, 2007

(54) METHOD OF BRANDING THE KEYPAD OF A WIRELESS DEVICE

(75) Inventor: Roger C. Mahn, Canton, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 485 days.

(21) Appl. No.: 10/236,292

(22) Filed: Sep. 4, 2002

(65) Prior Publication Data

US 2004/0203509 A1    Oct. 14, 2004

(51) Int. Cl.
*H04M 1/00* (2006.01)
(52) U.S. Cl. .................. 455/550.1; 455/90.3; 361/679; 345/168; 200/344; 379/433.07
(58) Field of Classification Search ............ 455/575.1, 455/550.1, 90.3; 361/679, 680; 345/168; 200/344; 379/433.07
See application file for complete search history.

(56) References Cited

U.S. PATENT DOCUMENTS

2002/0044226 A1*    4/2002    Risi ........................... 348/734

* cited by examiner

*Primary Examiner*—Lee Nguyen
(74) *Attorney, Agent, or Firm*—Gardner Groff Santos & Greenwald, P.C.

(57) ABSTRACT

A method of branding a wireless device, and a wireless device, are provided. The wireless device includes a housing having at least a first wall. The first wall includes a keypad area including a plurality of keypads. A logo is provided in a design of the keypads. The logo is provided by at least one of stenciling, embossing, silk screening, coloring, painting, texturing, indenting, or applying at least one sticker in the keypad area around one or more keypads; coloring or painting one or more keypads; or a combination of any of the foregoing.

26 Claims, 6 Drawing Sheets

METHOD OF BRANDING THE KEYPAD OF A WIRELESS DEVICE

DESCRIPTION OF THE INVENTION

1. Field of the Invention

The present invention relates to a method of branding a wireless device and, more particularly, to providing a logo as part of a design of keypads of the wireless device.

2. Background of the Invention

Wireless devices include cellular phones, pagers, personal digital assistants (PDAs), and the like. Generally, a wireless device is manufactured by one entity that sells these devices to a wireless carrier. The wireless carriers provide the equipment, such as satellites and cell towers, which enable users of the wireless devices to send and receive wireless communications from the wireless devices. It should be appreciated that there are numerous wireless device manufacturers, including KYOCERA, MOTOROLA, NOKIA, SAMSUNG, SANYO, and SONY ERICSSON, as well as numerous wireless carriers, including CINGULAR WIRELESS ("CINGULAR"), ALLTEL, AT&T WIRELESS, SPRINT PCS, VERIZON WIRELESS, and VOICESTREAM WIRELESS. The wireless carrier in turn sells the wireless devices to end users such as individuals or companies whose employees use the wireless devices for wireless communications.

As with any other product, companies desire to place their company name, trademark, or logo onto the product in a manner such that the user of the product, and anyone else who views the product, sees the company's name, trademark, or logo, and recognizes the product as made, sold, and/or distributed by that company. Branding a product is thus a highly valuable tool to get consumers to recognize one's products and hopefully to buy and/or use one's products in the future.

The wireless device manufacturer typically places a plurality of logos on the devices, both of the manufacturer and of the wireless carrier. Traditionally, with respect to visibility of a company logo to the end user, as well as the general public, the wireless device manufacturer has primary branding placement and the wireless carrier has secondary branding placement. The manufacturer's logos typically include the company logo for that manufacturer and the logo for the specific brand of the device. The wireless carrier's logo typically includes the company logo for that wireless carrier.

The logos are typically stenciled, embossed, or silk screened into a housing of the wireless device or, in the alternative, are placed on stickers that are adhered to the housing.

Figure 6:
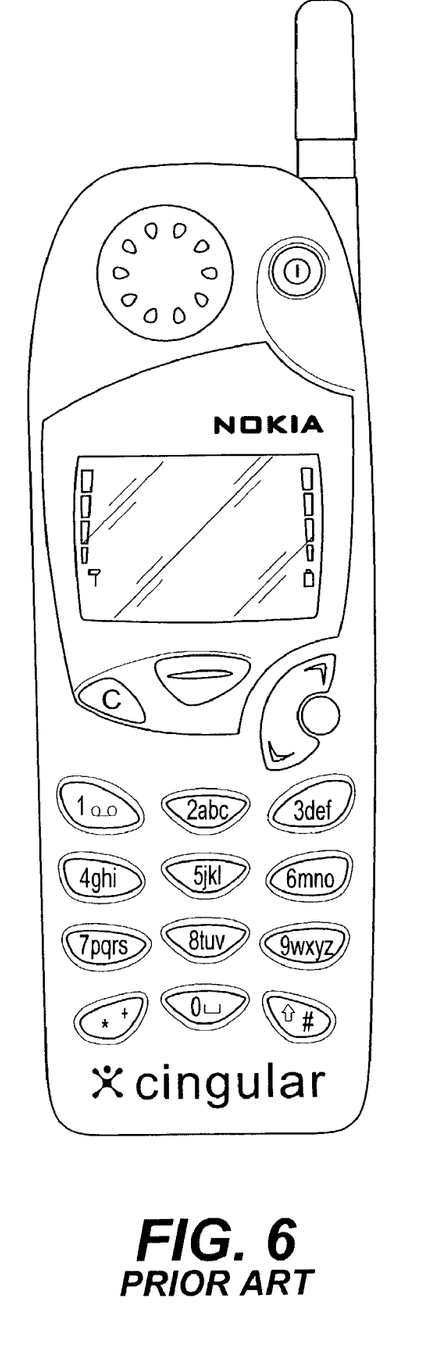
FIG. 6 is a front plan view of a prior art wireless device.

Often, the wireless device manufacturer places the company logo of the wireless carrier at or near the bottom of the wireless device. FIG. 6 illustrates one currently available wireless device, the NOKIA 5165 cellular telephone. This type of wireless device is manufactured by NOKIA, who sells the devices to CINGULAR, the assignee of the present invention. CINGULAR then sells the devices to end users. As shown in FIG. 6, NOKIA provides its own logo just above a screen area and CINGULAR'S logo at the bottom of the wireless device, below the keypads.

As wireless devices become smaller, it can become difficult to brand these devices with logos. More particularly, as these devices become smaller, the screen area and/or the keypad area of the device takes up more space over the front of the device, which leaves less space for the placement of logos on the front of the device. As a result, the stickers with the logos thereon have become smaller, the company logos on these stickers have become smaller, and/or the company logos stenciled on the wireless device have become smaller. This results in a diminished impact of the company logo on the end user, as well as on the general public.

Also, on many wireless devices, the wireless device manufacturer places its own name or logo onto the back of the device, such as by stenciling, often on the battery cover of the device. While a user would see the logo or name of the company if he/she viewed the back of the device, users more often view the front of the device when in use.

The present invention solves these needs and others, by providing a method of branding a logo as part of a design of the keypads of the wireless device, an area often looked to by users of the wireless device.

SUMMARY OF THE INVENTION

The present invention provides a method of branding a wireless device. The wireless device includes a housing having at least a first wall. The first wall includes a keypad area including a plurality of keypads. The method comprises the step of providing a logo as part of a design of the keypads.

The present invention also provides a wireless device. The wireless device comprises a housing having at least a first wall including a keypad area including a plurality of keypads. A logo is provided in a design of the keypads.

In one embodiment, the logo is provided by at least one of stenciling, embossing, silk screening, coloring, painting, texturing, indenting, or applying at least one sticker in the keypad area around one or more keypads; or coloring or painting one or more keypads. In another embodiment, the logo is provided by a plurality of stenciling, embossing, silk screening, coloring, painting, texturing, indenting, or applying at least one sticker in the keypad area around one or more keypads; coloring or painting one or more keypads; or a combination of any of the foregoing.

In one embodiment, the logo is of at least one of a wireless carrier or a manufacturer of the wireless device. In one embodiment, the logo is at least one of a company name, logo, or trademark.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

The present invention provides a method of branding a logo, company name, or trademark on a wireless device by providing the logo, name, or trademark as part of a design of keypads of the wireless device.

As shown in FIGS. 1–4, the wireless device 10 includes a housing 12 with at least a first wall 14. The first wall 14 typically includes a speaker area 16, a screen area 22, and a keypad area 24. As shown, the first wall 14 may be considered to be the "front" wall because it is the wall visible to the user when in use.

The speaker area 16 is generally proximal to the top of the device 10. A microphone (not shown) is generally positioned proximal to the bottom of the device. With the speaker area 16 proximal to the top and the microphone proximal to the bottom, the user may place the speaker area near his/her ear and the microphone near his/her mouth at the same time.

While as shown the speaker area 16 is circular, it should be appreciated the speaker area 16 may comprise of variety of shapes, including, but not limited to, square, rectangular, or triangular. The speaker area 16 includes at least one speaker opening 18 and, in one embodiment, one or more false holes 20. The at least one speaker opening 18 allows sound to travel from one or more speakers provided within the housing 12 to outside the housing 12. The false holes 20 are provided to resemble speaker openings so as to give the appearance that the speaker area is large, imparting a feeling of better sound quality to the user. The speaker opening(s) 18 and the false holes 20 may comprise a variety of shapes and sizes, including, but not limited to, circular, rectangular, square, oval, or tear drop.

The screen area 22 is provided to show graphics, numbers, letters, and the like. For example, if the user wants to call someone at a particular telephone number, he/she would press the desired numbers in the keypad area 24 and the numbers pressed would appear on the screen area 22. In addition, if the user wants to play a game on the device, graphics for the game would appear on the screen area 22. Again, while as shown the screen area 22 is generally square in shape, it should be appreciated that the screen area 22 may comprise a variety of shapes, including, but not limited to, circular, rectangular, or triangular.

For a cellular telephone, the keypad area 24 includes a plurality of keypads 60–82, typically for the numbers one through nine, the # sign, and the * sign, in four rows and three columns, similar to most, if not all, non-rotary telephones. In addition, other keypads may be provided on the housing 10, such as a clear keypad (often labeled "c" on cellular telephones) and an up and down keypad (often labeled with up and down arrows.) Each keypad may comprise a variety of shapes and sizes. Examples of shapes include, but are not limited to, oval, square, or circular.

As stated above, the present invention provides a method of branding a logo, company name, or trademark on a wireless device by providing the logo, name, or trademark as part of a design of keypads of the wireless device. The keypad area where the keypads are located is often the focal point of the end user's view. For example, when a person desires to call a telephone number, he/she would have to look at the keypad area to see the numbers he/she must depress to dial that telephone number. Also, if the person is storing information into the wireless device, such as a person's name and telephone number, he/she would also look to the keypad area to input that information. And, if the person desires to play a game provided with the wireless device, he/she often has to look to the keypad area as the keypads are often used in controlling movements in those games. Thus, placing the logo, company name, or trademark where the end user often looks provides increased brand impact on at least the end user, as well as the general public.

The logo, company name, or trademark may be provided in any manner which distinguishes the logo, company name, or trademark from the background in the keypad area and/or the keypads. More particularly, the logo, name, or trademark may be provided by, for example, stenciling, embossing, silk screening, coloring, painting, texturing, indenting, or applying a sticker to the keypad area around one or more keypads; coloring or painting one or more keypads; reshaping one or more keypads; and/or a combination of any of the foregoing.

The term "stenciling" includes, for example, a printing process of printing with a sheet, often made of plastic, in which lettering or a design has been cut so that ink or paint applied to the sheet will reproduce the pattern on a surface beneath the sheet. The term "embossing" includes, for example, a molding or carving process in which a raised design or a design in relief is molded or carved into a surface. The term "silk screening" includes, for example, a printing process of printing with a screen of silk or other fine mesh in which lettering or a design has been imposed thereon and on which an impermeable substance is coated on blank areas, wherein ink or paint is forced through the mesh onto a surface to be printed. The term "coloring" includes, for example, imparting a color to or changing the color of a surface. The term "painting" includes, for example, covering a surface with paint. The term "texturing" includes, for example, giving a desired texture, such as rough or grainy, to a surface. The term "indenting" includes, for example, impressing lettering or a design into a surface. The term "reshaping" includes, for example, imparting a particular form or shape to a keypad.

Figure 5:
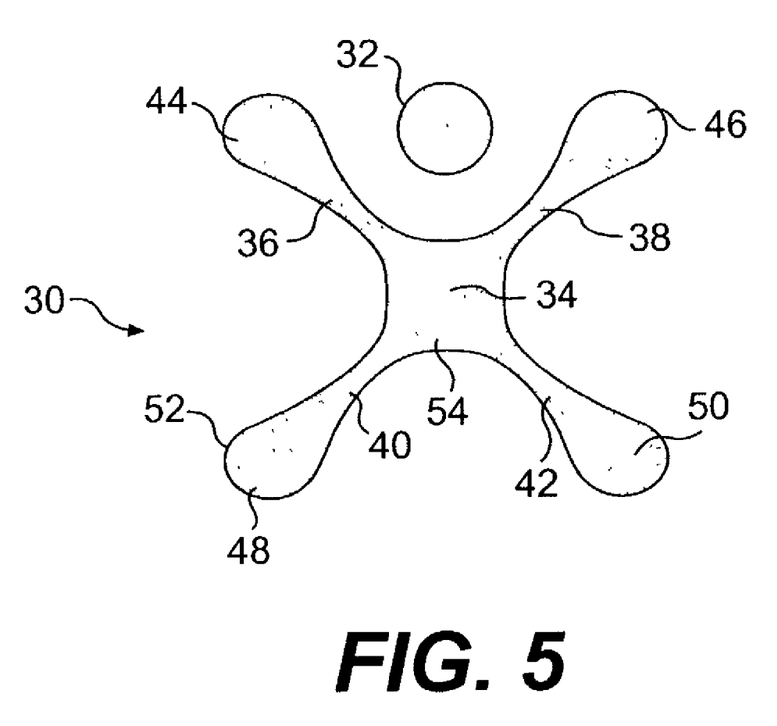
FIG. 5 is an example of a company logo, the logo being that of the Assignee of the present invention.

An example of a logo for a wireless device manufacturer or a wireless carrier is that of CINGULAR, the Assignee of the present invention. As shown in FIG. 5, CINGULAR has a logo 30 that resembles a person shaped like a toy jack with a round ball for a head. This logo 30 includes a head portion 32 and a trunk body portion 34 with arm portions 36, 38 and leg portions 40, 42.

The head portion 32 generally has a circular shape and is separate from the body portion 34. The body portion 34 generally has a square shape, with integral outstretched arm portions 36, 38 and leg portions 40, 42. The arm portions 36, 38 have hand portions 44, 46, respectively. Similarly, the leg portions 40, 42 have foot portions 48, 50, respectively. The logo 30 has an outline 52. The logo 30 also has an area 54, being all that area inside the circle of the head portion 42 and within the integral body portion 34. The area 54 is shown shaded in the FIGS. It should be appreciated that the shaded areas in FIGS. 1–5 may depict areas on the wall 14 and/or one or more keypads that are colored, painted, indented, or textured. If colored or painted, for the logo 30 of the Assignee, this color may be a shade of orange. Examples of the method of branding a wireless device will now be discussed, utilizing the logo 30 shown in FIG. 5.

Figure 1:
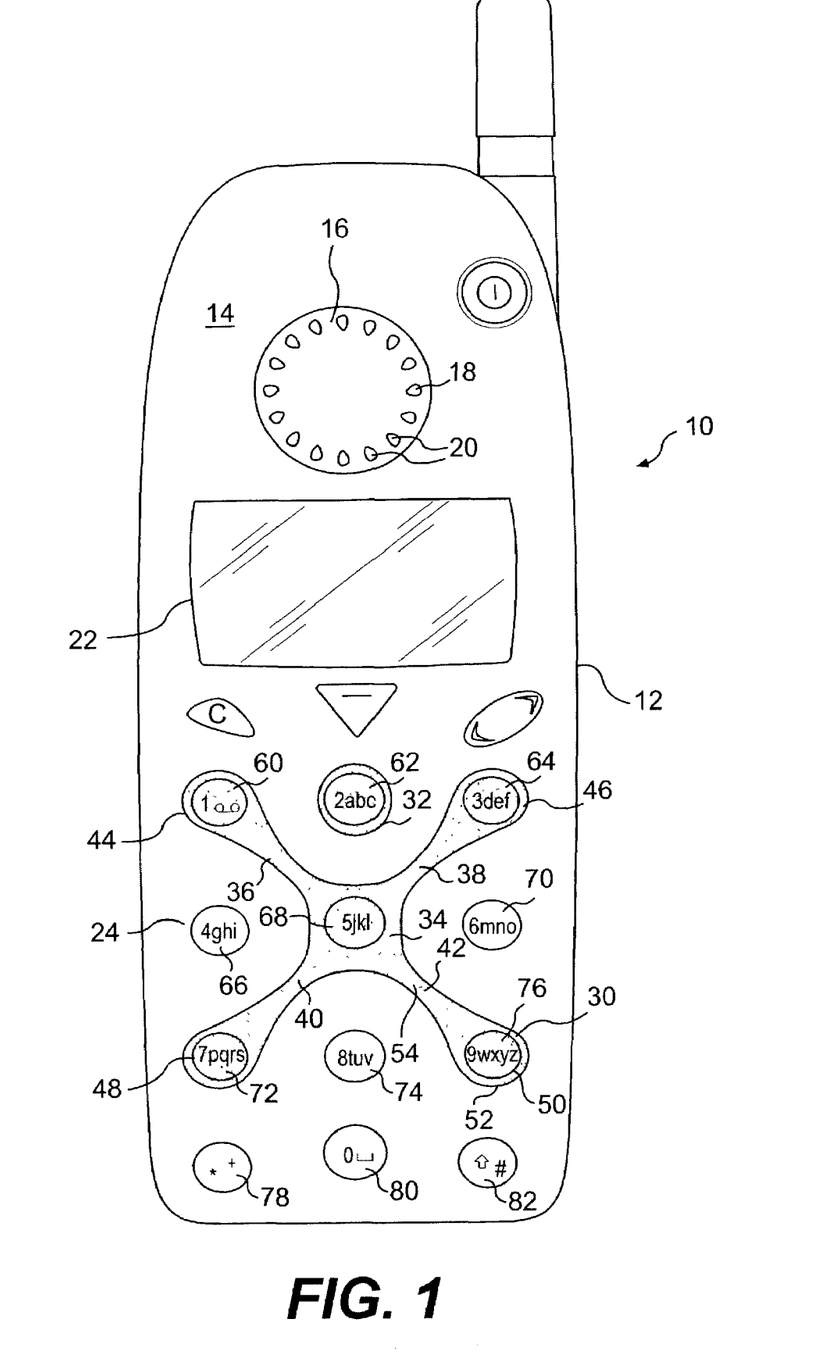
FIG. 1 is a front plan view of one embodiment of a wireless device branded with a logo in a design of keypads of the device.

As shown in FIG. 1, in one embodiment, the logo 30 is provided by coloring or painting one or more of the keypads and/or stenciling, embossing, silk screening, coloring, painting, texturing, indenting, applying a sticker to, or a combination of any of the foregoing, areas around one or more of the keypads to form the area 54 of the logo 30 on the wall 14 of the device 10. In one embodiment, the logo 30 may be further provided by stenciling, embossing, silk screening, coloring, painting, texturing, indenting, applying a sticker to, or a combination thereof at least a portion of the outline 52 of the logo 30 around one or more of the keypads on the wall 14 of the device 10.

In one embodiment (not shown), for the head portion 32, the keypad 62 (i.e., the keypad for the number 2) is colored or painted. In an alternative embodiment, as shown in FIG. 1, for a larger head portion 32 than just the keypad 62, an area of the wall 14 around that keypad 62 is stenciled, embossed, silk screened, colored, painted, textured, indented, a sticker applied to, or a combination thereof. In another alternative embodiment, the wall 14 may be stenciled, embossed, silk screened, colored, painted, textured, indented, a sticker applied to, or a combination thereof around the number 2 keypad 62 to form the outline of the head portion 32. For this embodiment, all of the area defined by the outline of the head portion 32 around the number 2 keypad 62 may be stenciled, embossed, silk screened, colored, painted, textured, indented, a sticker applied to, or a combination thereof, to complete the head portion 32.

As shown in FIG. 1, for the remainder of the logo 30, the number 5 keypad 68 is colored or painted for a portion of the trunk portion 34, the number 1 keypad 60 is colored or painted for a portion of the hand portion 44, the number 3 keypad 64 is colored or painted for a portion of the hand portion 46, the number 7 keypad 72 is colored or painted for a portion of the foot portion 48, and the number 9 keypad 76 is colored or painted for a portion of the foot portion 50. To complete the remainder of the logo 30, an area around the keypads is stenciled, embossed, silk screened, colored, painted, textured, indented, a sticker applied to, or a combination thereof, for the portions of the area 54 of the body portion 34, the arm portions 36, 38, the leg portions 40, 42, the hand portions 44, 46, and the foot portions 48, 50 that are not part of any keypad. If colored or painted, in an exemplary embodiment, the portions of the area 54 are colored or painted with generally the same color used to color the keypads for the numbers 1, 2, 3, 5, 7, and 9.

In one embodiment, the outline 52 of the body portion 34, the arm portions 36, 38, the leg portions 40, 42, the hand portions 44, 46 and the foot portions 48, 50 of the logo 30 may be applied to the wall 14 around the keypads by stenciling, embossing, silk screening, coloring, painting, texturing, indenting, applying a sticker to, or a combination thereof. For this embodiment, the area 54 within the outline 52 of the logo 30 around the keypads that is defined by the outline 52 may be stenciled, embossed, silk screened, colored, painted, textured, indented, a sticker applied, or a combination thereof.

Figure 2:
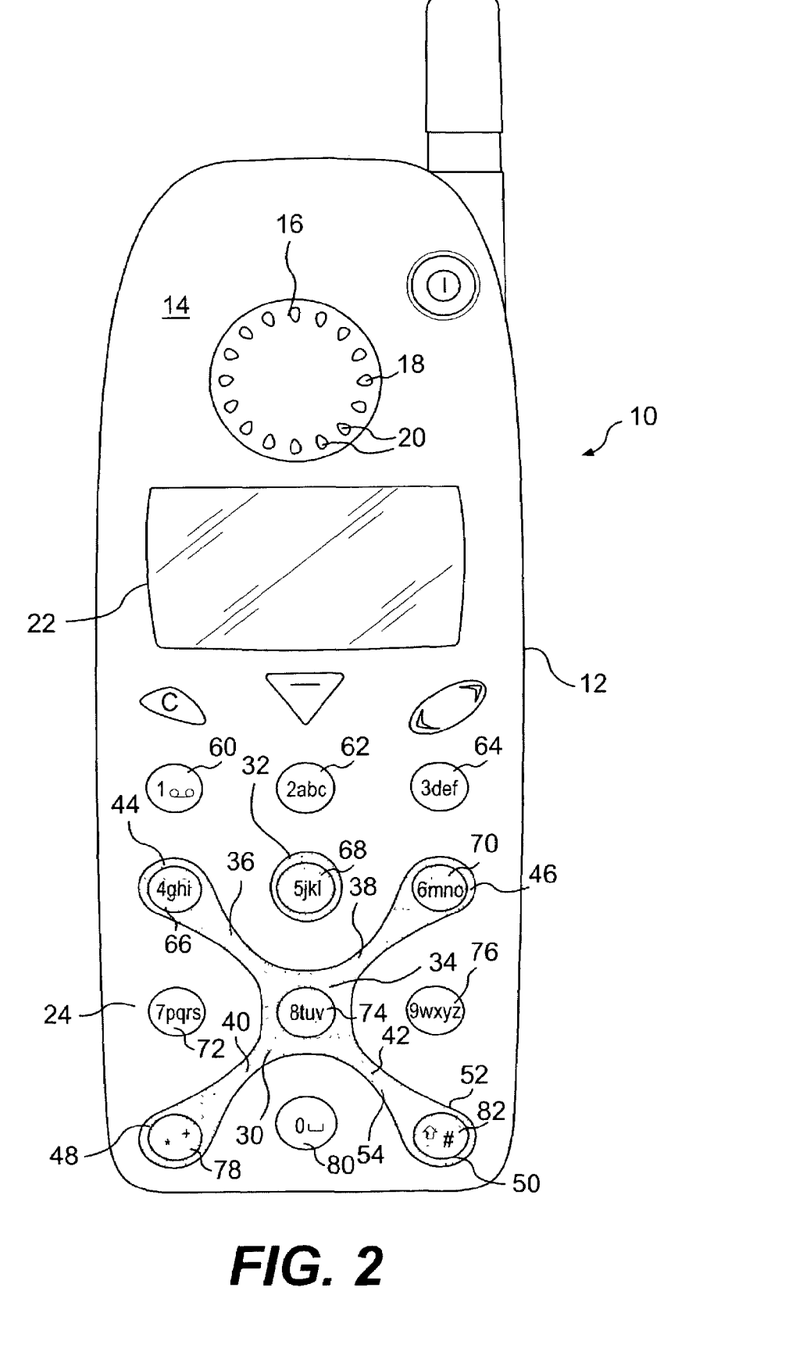
FIG. 2 is an alternative embodiment of the embodiment shown in FIG. 1.

An alternative of the embodiment of FIG. 1 is shown in FIG. 2. FIG. 2 is similar to FIG. 1, except that the logo 30 is "moved down" by a row of the keypads in the keypad area 24.

Figure 3:
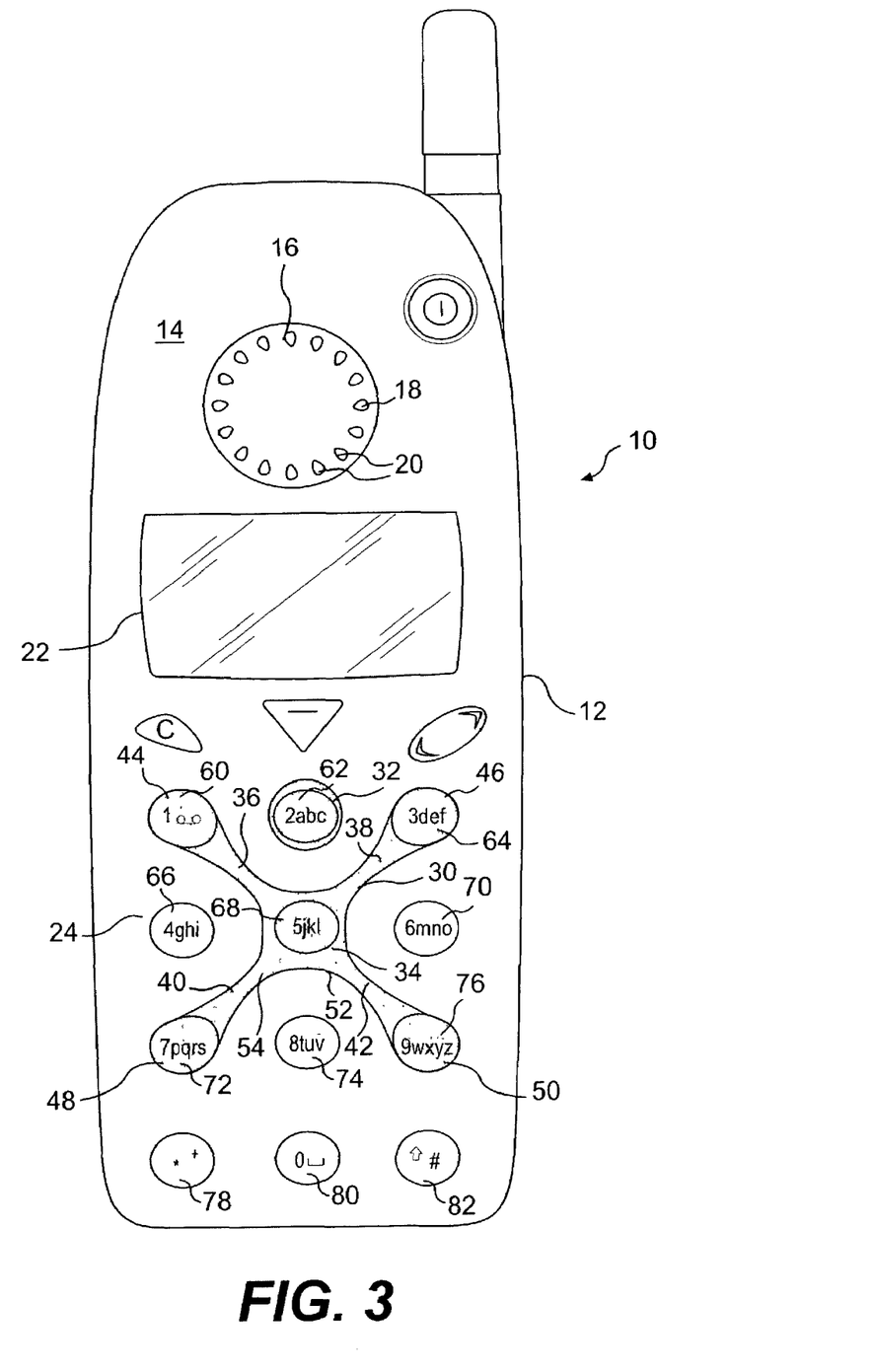
FIG. 3 is a front plan view of another embodiment of a wireless device branded with a logo in a design of keypads of the device.

As shown in FIG. 3, in another embodiment, the logo 30 is provided by reshaping one or more of the keypads; coloring or painting one or more of the keypads; stenciling, embossing, silk screening, coloring, painting, texturing, indenting, or applying a sticker to, areas around one or more of the keypads; or a combination of any of the foregoing to form the area 54 of the logo 30 on the wall 14 of the device 10. In one embodiment, the logo 30 may be further provided by stenciling, embossing, silk screening, coloring, painting, texturing, indenting, applying a sticker to, or a combination thereof, at least a portion of the outline 52 of the logo 30 around one or more of the keypads on the wall 14 of the device 10.

In one embodiment (not shown), for the head portion 32, the number 2 keypad 62 is colored or painted. In another embodiment (also not shown), the number 2 keypad 62 is shaped so as to provide the outline of the head portion 32. In an alternative embodiment, as shown in FIG. 3, for a larger head portion 32 than just the number 2 keypad 62, an area of the wall 14 around that keypad 62 is stenciled, embossed, silk screened, colored, painted, textured, indented, a sticker applied to, or a combination thereof. In another alternative embodiment, the wall 14 may be stenciled, embossed, silk screened, colored, painted, textured, indented, a sticker applied to, or a combination thereof, around the number 2 keypad 62 to form the outline of the head portion 32. For this embodiment, all of the area defined by the outline of the head portion 32 around the number 2 keypad 62 may be stenciled, embossed, silk screened, colored, painted, textured, indented, a sticker applied to, or a combination thereof, to complete the head portion 32.

As shown in FIG. 3, for the remainder of the logo 30, the number 1 keypad 60 is shaped to provide at least a portion of the outline of the hand portion 44; the number 3 keypad 64 is shaped to provide at least a portion of the outline of the hand portion 46; the number 7 keypad 72 is shaped to provide at least a portion of the outline of the foot portion 48; and the number 9 keypad 76 is shaped to provide at least a portion of the outline of the foot portion 50. In one embodiment (not shown), the number 5 keypad 68 is shaped to provide a portion of the outline of the trunk body portion 34.

As also shown in FIG. 3, in an exemplary embodiment, the number 5 keypad 68 is colored or painted for a portion of the trunk portion 34, the number 1 keypad 60 is colored or painted for a portion of the hand portion 44, the number 3 keypad 64 is colored or painted for a portion of the hand portion 46, the number 7 keypad 72 is colored or painted for a portion of the foot portion 48, and the number 9 keypad 76 is colored or painted for a portion of the foot portion 50. To complete the remainder of the logo 30, an area around the keypads is stenciled, embossed, silk screened, colored, painted, textured, indented, a sticker applied to, or a combination thereof, for the portions of the area 54 of the body portion 34, the arm portions 36, 38, the leg portions 40, 42, the hand portions 44, 46, and/or the foot portions 48, 50 that are not part of any keypad. If colored or painted, in an exemplary embodiment, the area 54 is colored or painted with generally the same color used to color the keypads for the numbers 1, 2, 3, 5, 7, and 9.

As shown in FIG. 3, in one embodiment, the first wall 14 is stenciled, embossed, silk screened, colored, painted, textured, indented, a sticker applied to, or a combination thereof, in the keypad area 24 so as to complete the outline 52 of the logo 30 not already provided by the reshaped keypads. For example, stenciling, embossing, silk screening, coloring, painting, texturing, indenting, applying a sticker to, or a combination thereof, is applied to the wall 14 between the number 1 keypad 60 and the number 3 keypad 64 to form a portion of the outline for the arm portions 36, 38; between the number 3 keypad 64 and the number 9 keypad 76 to form a portion of the outline for the arm portion 38 and the leg portion 42; between the number 7 keypad 72 and the number 9 keypad 76 to form a portion of the outline for the leg portions 40, 42; and between the number 1 keypad 60 and the number 7 keypad 72 to form a portion of the outline for the arm portion 36 and the leg portion 40.

In an alternative embodiment (not shown), the outline 52 of the logo is stenciled, embossed, silk screened, colored, painted, textured, indented, a sticker applied to, or a combination thereof, on the wall 14 spaced from the number 1, 3, 7, and 9 keypads 60, 64, 72, and 76, respectively. In this manner, the logo 30 is larger than the area defined by these keypads as shown in FIG. 3.

In another embodiment, after the wall 14 is stenciled, embossed, silk screened, colored, painted, textured, indented, a sticker applied to, or a combination thereof, to complete the outline 52 of the logo 30, the area 54 within the outline 52 of the logo 30 around the shaped number 1, 3, 7, and 9 keypads 60, 64, 72, and 76, respectively, is stenciled, embossed, silk screened, colored, painted, textured, indented, a sticker applied to, or a combination thereof. Again, if colored or painted, in an exemplary embodiment, the area 54 is colored or painted with generally the same color used to color the number 1, 2, 3, 5, 7, and 9 keypads 60, 62, 64, 68, 72, and 76, respectively.

Figure 4:
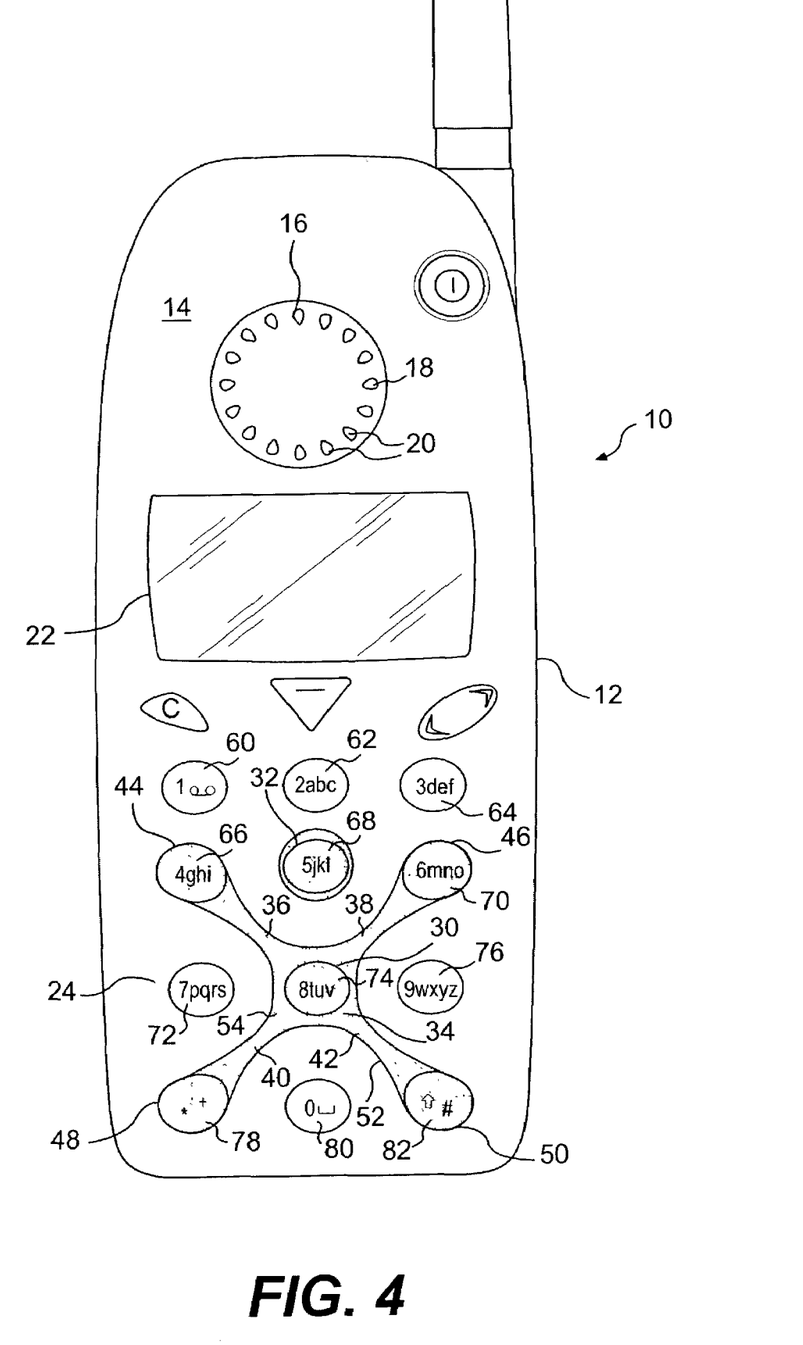
FIG. 4 is an alternative embodiment of the embodiment shown in FIG. 3.

An alternative of the embodiment shown in FIG. 3 is shown in FIG. 4. Similar to FIG. 2, FIG. 4 is similar to FIG. 3, except that the logo 30 is moved down a row of keypads in the keypad area 24.

Accordingly, the present invention allows a company to place its logo, name, or trademark as part of the design of keypads of a wireless device, an area where the end user often looks. This provides increased brand impact on at least the end user, as well as the general public. In one embodiment, the logo, name, or trademark is provided, at least in part, by, for example, stenciling, embossing, silk screening, coloring, painting, texturing, indenting, applying a sticker thereto, or a combination of any of the foregoing, the wall of the housing of the wireless device in and around the keypads. In addition, the logo, name, or trademark may be provided, at least in part, by coloring, painting, and/or reshaping individual keypads of the plurality of keypads.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of branding a wireless device, wherein the wireless device includes a housing having plurality of keys and a keypad area defined by an outermost extent of the plurality of keys, the method comprising the step of providing a logo at least partially within the keypad area of the housing, wherein two or more of the keys are used as part of the logo.

2. The method of branding a wireless device of claim 1, wherein the logo is provided by stenciling the keypad area around and/or over two or more keys.

3. The method of branding a wireless device of claim 1, wherein the logo is provided by embossing the keypad area around and/or over two or more keys.

4. The method of branding a wireless device of claim 1, wherein the logo is provided by silk screening the keypad area around and/or over two or more keys.

5. The method of branding a wireless device of claim 1, wherein the logo is provided by coloring the keypad area around and/or over two or more keys.

6. The method of branding a wireless device of claim 1, wherein the logo is provided by painting the keypad area around and/or over two or more keys.

7. The method of branding a wireless device of claim 1, wherein the logo is provided by texturing the keypad area around and/or over two or more keys.

8. The method of branding a wireless device of claim 1, wherein the logo is provided by indenting the keypad area around and/or over two or keys.

9. The method of branding a wireless device of claim 1, wherein the logo is provided by applying at least one sticker to the keypad area around and/or over two or more keys.

10. The method of branding a wireless device of claim 1, wherein the logo is provided by coloring two or more keys.

11. The method of branding a wireless device of claim 1, wherein the logo is provided by painting two or more keys.

12. The method of branding a wireless device of claim 1, wherein the logo is of at least one of a wireless carrier or a manufacturer of the wireless device.

13. The method of branding a wireless device of claim 1, wherein the logo is at least one of a company name, logo, or trademark.

14. A wireless device, comprising: a housing having a plurality of keys and a keypad area defined by an outermost extent of the plurality of keys, and wherein a logo is provided at least partially within the keypad area of the housing, wherein two or more of the keys are used as part of the logo.

15. The wireless device of claim 14, wherein the logo is provided by stenciling the keypad area around and/or over two or more keys.

16. The wireless device of claim 14, wherein the logo is provided by embossing the keypad area around and/or over two or more keys.

17. The wireless device of claim 14, wherein the logo is provided by silk screening the keypad area around and/or over two or more keys.

18. The wireless device of claim 14, wherein the logo is provided by coloring the keypad area around and/or over two or more keys.

19. The wireless device of claim 14, wherein the logo is provided by painting the keypad area around and/or over two or more keys.

20. The wireless device of claim 14, wherein the logo is provided by texturing the keypad area around and/or over two or more keys.

21. The wireless device of claim 14, wherein the logo is provided by indenting the keypad area around and/or over two or more keys.

22. The wireless device of claim 14, wherein the logo is provided by applying at least one sticker to the keypad area around and/or over two or more keys.

23. The wireless device of claim 14, wherein the logo is provided by coloring two or more keys.

24. The wireless device of claim 14, wherein the logo is provided by painting two or more keys.

25. The wireless device of claim 14, wherein the logo is at least one of a wireless carrier or a manufacturer of the wireless device.

26. The wireless device of claim 14, wherein the logo is at least one of a company name, logo, or trademark.

* * * * *